(12) United States Patent
Layne et al.

(10) Patent No.: US 11,946,410 B1
(45) Date of Patent: Apr. 2, 2024

(54) VARIABLE GEOMETRY TURBOCHARGER ASSESSMENT

(71) Applicant: Caterpillar Inc., Peoria, IL (US)

(72) Inventors: Matthew E. Layne, Chillicothe, IL (US); Alok K. Puri, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/345,796

(22) Filed: Jun. 30, 2023

(51) Int. Cl.
  *F02B 37/22* (2006.01)
  *F02B 39/16* (2006.01)
  *F02B 37/12* (2006.01)

(52) U.S. Cl.
  CPC .............. *F02B 37/22* (2013.01); *F02B 39/16* (2013.01); *F02B 2037/122* (2013.01)

(58) Field of Classification Search
  CPC .......... F02B 37/22; F02B 37/20; F02B 37/24; F02B 39/16; F02B 41/0007; F02B 41/00; F02B 41/10; F02B 2037/122; F02B 2039/166; F02B 2039/168; F02B 2039/164; F02B 2039/162; Y02T 10/12; Y02T 10/40
  See application file for complete search history.

(56) References Cited

U.S. PATENT DOCUMENTS

| | | | |
|---|---|---|---|
| 7,104,120 B2 | 9/2006 | Gladden | |
| 7,631,498 B2 | 12/2009 | Greentree | |
| 10,480,397 B2 * | 11/2019 | Kim | F02D 35/0007 |
| 10,800,415 B2 * | 10/2020 | Hu | F02B 37/18 |
| 2006/0207253 A1 * | 9/2006 | Sumser | F02B 37/225 |
| | | | 60/602 |
| 2010/0292937 A1 | 11/2010 | Hosny et al. | |
| 2013/0060417 A1 | 3/2013 | Oriet et al. | |
| 2015/0128907 A1 * | 5/2015 | Redon | F02B 75/28 |
| | | | 123/46 R |

* cited by examiner

*Primary Examiner* — Shafiq Mian
*Assistant Examiner* — Dapinder Singh
(74) *Attorney, Agent, or Firm* — Harrity & Harrity, LLP

(57) ABSTRACT

In some implementations, a controller may cause first adjustment of at least one component of a variable geometry turbocharger (VGT) of the machine. The controller may cause, based on causing the first adjustment of the at least one component of the VGT, second adjustment of the at least one component of the VGT. The controller may determine, based on causing the second adjustment of the at least one component of the VGT, an amount of time for a speed of the VGT to decrease to less than or equal to speed threshold. The controller may determine, based on the amount of time, VGT assessment information. The controller may determine, based on the VGT assessment information, one or more actions to be performed.

20 Claims, 4 Drawing Sheets

VARIABLE GEOMETRY TURBOCHARGER ASSESSMENT

TECHNICAL FIELD

The present disclosure relates generally to a variable geometry turbocharger (VGT) and, for example, to a VGT assessment.

BACKGROUND

A VGT is a type of turbocharger with an adjustable geometry that can be used in a machine to facilitate an optimized performance of the machine. For example, one or more components of the VGT can adjust to control a flow and/or pressure of exhaust gas flowing through the VGT, which enables improved efficiency, enhanced power output, and better response in the machine. Typically, a VGT includes one or more bearings that facilitate turning of a shaft that connects a turbine and a compressor of the VGT. Over an operable life of the VGT, the one or more bearings are subject to wear, which can ultimately lead to failure of the one or more bearings, and thereby failure of the VGT. Failure of the one or more bearings (and failure of the VGT) can result in an impaired performance of the machine, and in damage to nearby components of the VGT.

U.S. Pat. No. 7,104,120 (the '120 patent) discloses an electronic control module that includes a turbocharger life determining algorithm being operable to estimate the life of a turbocharger, in part, based on a relationship between a sensed compressor inlet pressure and a sensed compressor outlet pressure. Per the '120 patent, the relationship may be illustrated as a ratio of the sensed compressor inlet pressure and the sensed compressor outlet pressure, which is correlated to turbocharger speed. While the '120 patent discloses some benefits for estimating a life of a turbocharger with fixed components (e.g., a non-variable-geometry turbocharger), the present disclosure is associated with assessing a VGT (e.g., a turbocharger with at least one adjustable component, rather than fixed components).

The controller of the present disclosure solves one or more of the problems set forth above and/or other problems in the art.

SUMMARY

A machine comprising: a VGT; and a controller configured to: determine, based on operation of the machine, that one or more VGT assessment initial conditions are satisfied; cause, based on determining that the one or more VGT assessment initial conditions are satisfied, first adjustment of at least one component of the VGT to cause the VGT to restrict a flow of exhaust gas through the VGT and to cause a speed of the VGT to increase to be greater than or equal to a first speed threshold; determine, based on causing the first adjustment of the at least one component of the VGT, that the speed of the VGT is stable for a period of time; cause, based on determining that the speed of the VGT is stable for the period of time, second adjustment of the at least one component of the VGT to cause the VGT to cease restricting the flow of exhaust gas through the VGT and to cause the speed of the VGT to decrease to be less than or equal to a second speed threshold; determine, based on causing the second adjustment of the at least one component of the VGT, an amount of time for the speed of the VGT to decrease from greater than or equal to the first speed threshold to less than or equal to the second speed threshold; determine, based on the amount of time, VGT assessment information; and cause, based on the VGT assessment information, one or more actions to be performed.

A controller of a machine may include one or more memories; and one or more processors configured to: cause first adjustment of at least one component of a VGT of the machine; determine, based on causing the first adjustment of the at least one component of the VGT, that a speed of the VGT is stable for a period of time; cause, based on determining that the speed of the VGT is stable for the period of time, second adjustment of the at least one component of the VGT; determine, based on causing the second adjustment of the at least one component of the VGT, an amount of time for the speed of the VGT to decrease from greater than or equal to a first speed threshold to less than or equal to a second speed threshold; determine, based on the amount of time, VGT assessment information; and cause, based on the VGT assessment information, one or more actions to be performed.

A method may include causing, by a controller of a machine, first adjustment of at least one component of a VGT of the machine; causing, by the controller and based on causing the first adjustment of the at least one component of the VGT, second adjustment of the at least one component of the VGT; determining, by the controller and based on causing the second adjustment of the at least one component of the VGT, an amount of time for a speed of the VGT to decrease to less than or equal to speed threshold; determining, by the controller and based on the amount of time, VGT assessment information; and determining, by the controller and based on the VGT assessment information, one or more actions to be performed.

DETAILED DESCRIPTION

This disclosure relates to a controller, such as an engine control module (ECM), controlling a VGT to assess the VGT (to determine whether the VGT is in an end-of-life state). The controller and the VGT, as described herein, have universal applicability to any machine utilizing such a controller and a VGT. The term "machine" may refer to a vehicle, any machine that performs an operation associated with an industry such as, for example, mining, construction, farming, transportation, or any other industry, and any other machine that includes a VGT. As some examples, the machine may be an automobile (e.g., passenger car, truck, or other vehicle), an off-highway truck, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, a pump, a power generation set (e.g., a "genset"), stationary equipment, non-stationary equipment, or other above ground equipment, underground equipment, aerial equipment, or marine equipment.

Figure 1:
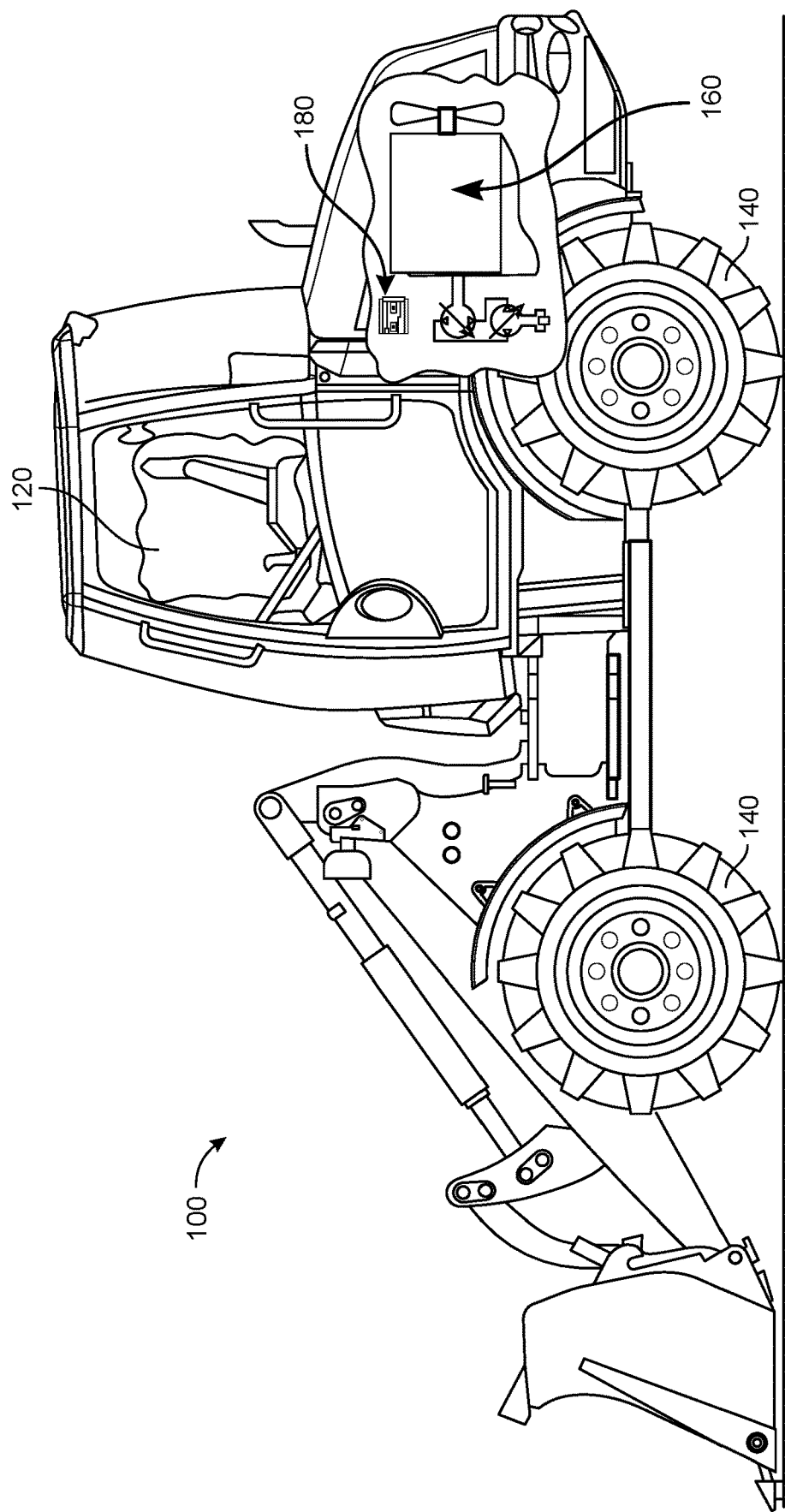
FIG. 1 is a diagram of an example machine described herein.

FIG. 1 is a diagram of an example machine 100 described herein. For example, machine 100 may include a mobile machine, such as the wheel loader shown in FIG. 1, or any other type of mobile machine. Machine 100 may include an operator station 120, one or more traction devices 140 (sometimes referred to as ground engagements), a power source 160 operatively connected to provide power to drive at least one of traction devices 140, and a controller 180 (e.g., an ECM) connected to one or more components of machine 100. The controller 180 may perform operations related to controlling a VGT of the power source 160 (e.g., to perform a VGT assessment), as described in more detail elsewhere herein.

As indicated above, FIG. 1 is provided as an example. Other examples may differ from what is described in connection with FIG. 1.

Figure 2:
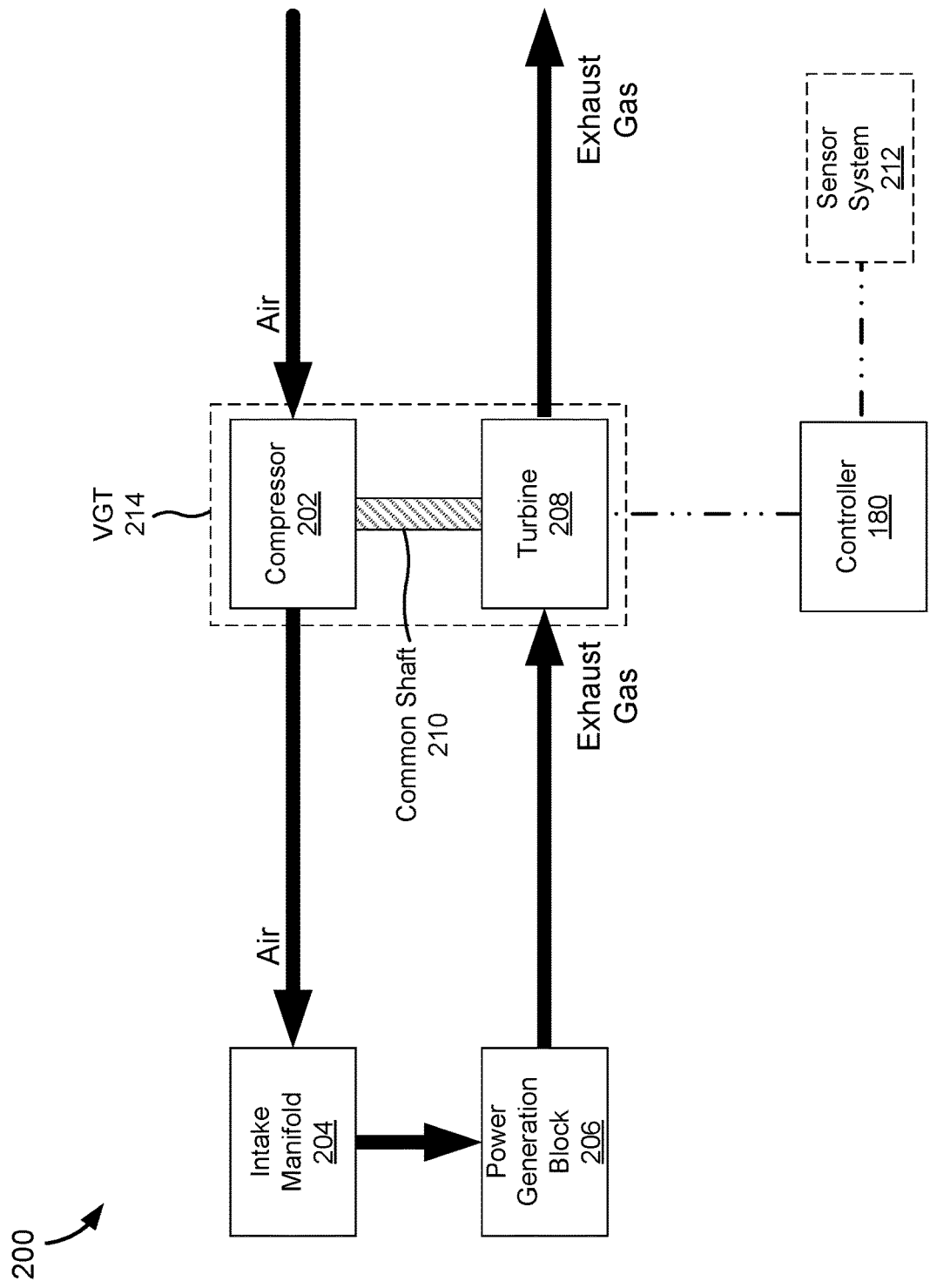
FIG. 2 is a diagram of an example power system described herein.

FIG. 2 is a diagram of an example power system 200 described herein, which may be included in the power source 160. The power system 200 may include a compression ignition, internal combustion engine, or may include any other type of internal combustion engine. Additionally, or alternatively, the power system 200 may include a fuel cell, another type of combustion engine, and/or another type of energy conversion device. The power system 200 may be fueled by such fuels as gasoline, distillate diesel fuel, biodiesel, dimethyl ether, gaseous fuels, such as hydrogen, natural gas, and propane, alcohol, ethanol, and/or any combination thereof. As shown in FIG. 2, the power system 200 may include a compressor 202, an intake manifold 204, a power generation block 206, a turbine 208, a common shaft 210, a sensor system 212, the controller 180, and/or one or more other components (not shown). Together, the compressor 202, the turbine 208, and the common shaft 210 form a VGT 214, as further described herein.

As further shown in FIG. 2, air (e.g., ambient air from an environment external to the power system 200) may be introduced into the power system 200, such as via the compressor 202. In some implementations, an exhaust gas (e.g., produced by the power generation block 206 of the power system 200) may be provided to the compressor 202 (e.g., via an exhaust gas recirculation (EGR) system, not shown), and therefore the compressor 202 may introduce air and the exhaust gas into the power system 200. The compressor 202 may pressurize and provide the air (or the air and the exhaust gas) to the intake manifold 204. The intake manifold 204 may mix and distribute the air (or the air and the exhaust gas) to the power generation block 206 for use in a subsequent power production process (e.g., to generate and provide power to drive at least one of traction devices 140 of the machine 100).

As part of the power production process, the power generation block 206 produces an exhaust gas that flows from the power generation block 206. For example, when the power generation block 206 includes a plurality of cylinders (e.g., six or more cylinders), the plurality of cylinders may produce an exhaust gas as a result of a combustion process. The exhaust gas may flow to the turbine 208. A portion of the exhaust gas may be provided to the compressor 202 (e.g., via the EGR system).

The turbine 208 may be located to receive the exhaust gas from the power generation block 206 and may be connected to the compressor 202 via the common shaft 210. As the exhaust gas flows through the turbine 208 and expands against vanes thereof, the turbine 208 may rotate and drive the compressor 202 to pressurize air (or air and exhaust gas).

The turbine 208, the compressor, 202, and the common shaft 210 may form the VGT 214. That is, the VGT 214 may include an assembly that comprises the turbine 208, the compressor 202, and the common shaft 210 (e.g., where the turbine 208 and the compressor 202 are connected to the common shaft 210 via respective wheels), which is sometime referred to as a "shaft and wheel" assembly. The turbine 208 may be a variable geometry turbine that includes one or more adjustable vanes, such that a distance between the one or more adjustable vanes may be changed to alter a performance of the VGT 214. For example, the adjustable vanes may be extended to a "closed" position or may be retracted to an "open" position or a "partially open" position, which may control how much the common shaft 210 rotates and may therefore cause more or less of the energy from the flow of the exhaust gas to be transferred to the compressor 202 (e.g., via the common shaft 210). This may cause the compressor 202 to modify (e.g., increase or decrease) a flow of air (and/or a flow of air and exhaust gas) to the intake manifold 204. This, in turn, modifies (e.g., increases or decreases) a flow of exhaust gas through the VGT 214, which modifies (e.g., increases or decreases) a speed of the VGT 214 (e.g., a speed of the shaft and wheel assembly of the VGT 214, a speed at which the turbine 208 rotates on the common shaft 210, and/or another speed associated with the VGT 214).

The VGT 214 may include one or more bearings (e.g., to facilitate turning of the common shaft 210, which facilitates turning of the turbine 208 and the compressor 202 via the respective wheels of the common shaft 210). Over an operable life of the VGT 214, the one or more bearings are subject to wear. This wear can decrease a performance of the VGT, and ultimately lead to failure of the one or more bearings and therefore failure of the VGT 214. Accordingly, it is important to identify when the VGT 214 is in an end-of-life state (e.g., when failure of the one or more bearings is imminent), to allow for proactive replacement of the VGT 214 (e.g., before failure) and to therefore reduce a likelihood of an impaired performance of the power system 200 and/or components of the power system 200 that would be affected by a failure of the VGT 214.

The controller 180, as described further herein, may provide control of the power system 200 and/or components of the power system 200, such as the VGT 214. The controller 180 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor may be implemented in hardware, firmware, and/or a combination of hardware and software. The controller 180 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by the controller 180. The controller 180 may include a memory (e.g., a non-transitory computer-readable medium) capable of storing instructions, that when executed, cause the processor to perform one or more processes and/or methods described herein.

The sensor system 212 may provide measurements associated with various parameters used by the controller 180 to enable control of the power system 200 and/or components of the power system 200. The sensor system 212 may include physical sensors and/or any appropriate type of control system that generates values of sensing parameters based on a computational model and/or one or more measured parameters. As used herein, "sensing parameters" may refer to those measurement parameters that are directly measured and/or estimated by one or more sensors (e.g., physical sensors, virtual sensors, and/or other sensors). Example sensors may include temperature sensors (e.g., to measure a temperature of an oil of the engine of the power system 200), speed sensors (e.g., to measure a speed of the engine of power system 200 and/or a speed of the VGT 214, such as in terms of revolutions per minute (RPM)), position sensors (e.g., to measure respective positions of one or more components, such as one or more vanes of the turbine 208, of the VGT 214), pressure sensors (e.g., to measure a pressure, such as an intake manifold absolute pressure (IMAP) associated with the intake manifold 204 and/or backpressure on the VGT 214 caused by an exhaust gas treatment system of the power system 200, such as in terms of kilopascals (kPa)), engine airflow sensors (e.g., to measure an engine airflow rate, such as in terms of cubic meters per minute, cubic feet per minute, and/or the like), and/or other sensors. Sensing parameters may also include any output parameters that may be measured indirectly by physical sensors and/or calculated based on readings of physical sensors.

As indicated above, FIG. 2 is provided as an example. Other examples may differ from what is described in connection with FIG. 2.

Figure 3:
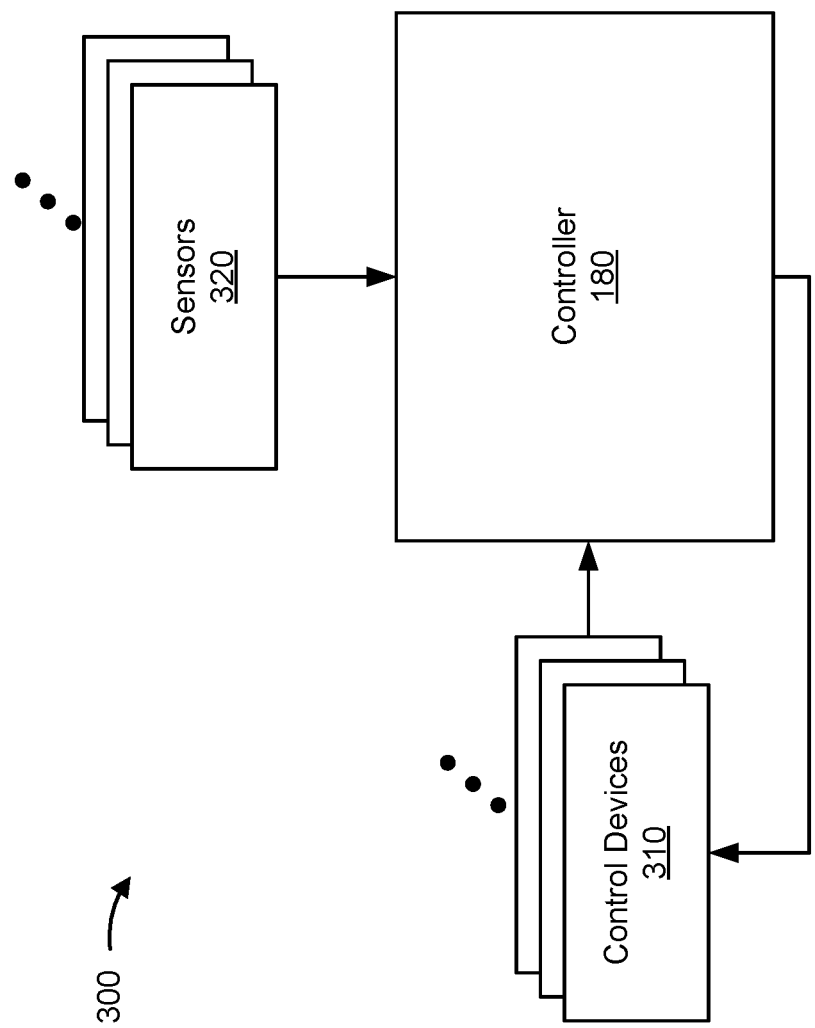
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more control devices 310 (referred to individually as "control device 310" and collectively as "control devices 310"), one or more sensors 320 (referred to individually as "sensor 320" and collectively as "sensors 320"), and the controller 180. Devices and/or components of environment 300 may interconnect via wired connections, wireless connections, or a combination of wired and wireless connections.

A control device 310 may be any type of device that may be used by the controller 180 to control a performance feature of the power system 200. For example, the control device 310 may include one or more actuators, switches, and/or the like that are capable of controlling a component of the power system 200. The control device 310 may be capable of causing adjustment of one or more components of the VGT 214, such as one or more adjustable vanes of the turbine 208 of the VGT 214 (e.g., from a first vane position to a second vane position). The sensors 320 may include any type of sensor configured to measure operating conditions of the power system 200. The sensors 320 may be sensors of the sensor system 212, as described herein.

The controller 180 may include one or more devices configured to control one or more components of the power system 200. For example, the controller 180 may be configured to control the VGT 214, such as to change (e.g., to control) a flow of exhaust gas through the VGT 214 and/or a speed of the VGT 214, among other examples. The controller 180 may control the one or more components of the power system 200 by sending one or more commands to the control device 310.

The controller 180 may obtain information concerning the power system 200 from the sensors 320 (e.g., directly from the sensors 320 or via one or more other components or devices of the power system 200, such as a different controller). For example, the controller 180 may obtain information concerning a speed of an engine of the power system 200, information concerning an oil temperature of the engine of the power system 200, information concerning a setting of the VGT 214 (e.g., an "open" setting, a "closed" setting, or a "partially open" setting, that indicates a position of at least one component, such as at least one adjustable vane, of the turbine 208 of the VGT 214), and/or information concerning a speed of the VGT 214 (e.g., a speed of the turbine 208 of the VGT 214), among other examples. The controller 180 may obtain the information concerning the power system 200 based on operation of the machine 100. That is, the controller 180 may obtain the information when the machine is operating (e.g., the machine is powered on and operational).

The controller 180 may determine whether one or more VGT assessment initial conditions are satisfied (e.g., based on the information concerning the power system 200). For example, the controller 180 may process the information concerning the power system 200 to determine whether the one or more VGT assessment initial conditions are satisfied. When the controller determines that the one or more VGT assessment initial conditions are satisfied, the controller 180 may perform one or more operations further described herein (e.g., to facilitate performance of an accurate assessment of the VGT 214). Alternatively, when the controller 180 determines that the one or more VGT assessment initial conditions are not satisfied, the controller 180 may not perform any additional operation described herein (e.g., because performance of an accurate assessment of the VGT 214 is unlikely).

The one or more VGT assessment initial conditions may include, for example, whether the machine 100 is in an idle state, whether a speed of an engine (e.g., of the power source 160 and/or power system 200) is stable for a period of time (e.g., that may have a duration that is greater than or equal to 1 second, 2 seconds, 3 seconds, 4 seconds, 5 seconds, 10 seconds, or 15 seconds), whether an oil temperature of the engine is within a temperature range (e.g., that may have a range width that is less than or equal to 10 degrees)(° Celsius (C), 15° C., 20° C., or 25° C.), and/or whether at least one component of the VGT 214 is in a non-restricted position. Accordingly, to determine that the one or more VGT assessment initial conditions are satisfied, the controller 180 may determine that the machine 100 is in an idle state (e.g., the machine 100 is not moving and/or performing any work operations); that the speed of the engine is stable for the period of time (e.g., the speed of the engine varies less than 5% of a maximum of the speed of the engine from the start of the period of time to the end of the period of time); that the oil temperature of the engine is within the temperature range (e.g., the oil temperature is greater than or equal to a minimum of the temperature range and less than or equal to a maximum of the temperature range), and/or that at least one component of the VGT is in a non-restricted position (e.g., in an open position or a partially open position).

The controller 180 may cause a first adjustment of at least one component of the VGT 214 (e.g., based on determining that the one or more VGT assessment initial conditions are satisfied). For example, the controller 180 may cause at least one component (e.g., at least one adjustable vane) of the turbine 208 of the VGT 214 to adjust from a first position (e.g., from an open position or a partially open position) to a second position (e.g., a closed position). The second position may be associated with restricting a flow of exhaust gas through the VGT 214. Accordingly, the second position may be associated with increasing a speed of the VGT 214

(e.g., due to the restricted flow of exhaust gas). In this way, the controller 180 may cause the first adjustment of the at least one component of the VGT 214 to cause the VGT 214 to restrict a flow of exhaust gas through the VGT 214 and/or to cause the speed of the VGT 214 to increase. Further, the controller 180 may cause the first adjustment to cause the speed of the VGT 214 to increase to be greater than or equal to a first speed threshold. The first speed threshold may be, for example, a particular percentage of a maximum speed of the VGT 214. The particular percentage may be, for example, greater than or equal to 65%, 75%, 80%, 85%, 90%, or 95%.

The controller 180 may determine whether the speed of the VGT 214 is stable for a period of time (e.g., based on causing the first adjustment of the at least one component of the VGT 214). For example, the controller 180 may determine (e.g., based on obtaining information concerning the power system 200 from the sensors 320) a variability percentage of the speed of the VGT 214 from a start of the period of time to an end of the period of time (e.g., a difference between a maximum speed of the VGT 214 and a minimum speed of the VGT 214, represented as a percentage of the maximum speed of the VGT 214). The controller 180 may thereby determine whether the speed of the VGT 214 is stable for the period of time. For example, the controller 180 may determine whether the variability percentage is less than or equal to a particular percentage, which may be less than or equal to 1%, 2%, 3%, 4%, 5%, or 10%. When the controller 180 determines that the speed of the VGT 214 is stable for the period of time (e.g., the variability percentage is less than or equal to the particular percentage), the controller 180 may perform one or more operations further described herein (e.g., to facilitate an accurate assessment of the VGT 214). Alternatively, when the controller 180 determines that the speed of the VGT 214 is not stable for the period of time (e.g., the variability percentage is greater than or equal to the particular percentage), the controller 180 may not perform any additional operation described herein (e.g., because an accurate assessment of the VGT 214 is unlikely).

The controller 180 may cause a second adjustment of at least one component of the VGT 214 (e.g., based on determining that the speed of the VGT 214 is stable for the period of time). For example, the controller 180 may cause at least one component (e.g., at least one adjustable vane) of the turbine 208 of the VGT 214 (e.g., that was adjusted as part of the first adjustment) to adjust from the second position (e.g., from the closed position) to the first position or another position (e.g., to an open position or a partially open position). The first position may not be associated with restricting a flow of exhaust gas through the VGT 214. Accordingly, the first position may be associated with decreasing a speed of the VGT 214 (e.g., due to an unrestricted flow of exhaust gas). In this way, the controller 180 may cause the second adjustment of the at least one component of the VGT 214 to cause the VGT 214 to cease restricting the flow of exhaust gas through the VGT 214 and/or to cause the speed of the VGT 214 to decrease. Further, the controller 180 may cause the second adjustment to cause the speed of the VGT 214 to decrease to be less than or equal to a second speed threshold. The second speed threshold may be, for example, a particular percentage of a minimum, non-zero speed of the VGT 214. The particular percentage may be, for example, less than or equal to 105%, 110%, 115%, 120%, or 125%.

The controller 180 may determine an amount of time for the speed of the VGT 214 to decrease from greater than or equal to the first speed threshold to less than or equal to the second speed threshold (e.g., based on causing the second adjustment of at least one component of the VGT 214). For example, the controller 180 may identify a first instant of time that is associated with causing the second adjustment of the at least one component of the VGT 214 (e.g., an instant of time at which the second adjustment occurs) as a start of the amount of time, and may identify a second instant of time that is associated with the speed of the VGT 214 becoming less than or equal to the second speed threshold (e.g., an instant of time at which the speed of the VGT 214 crosses the second speed threshold). The controller 180 may thereby determine the amount of time as a difference between the first instant of time and the second instant of time.

Accordingly, the controller 180 may determine VGT assessment information (e.g., based on the amount of time). The assessment information may indicate, for example, that VGT 214 is in an end-of-life state (e.g., failure of the one or more bearings of the VGT 214 is imminent), or, alternatively, that the VGT 214 is not in an end-of-life state (e.g., failure of the one or more bearings of the VGT 214 is not imminent). In some implementations, the controller 180 may determine whether the amount of time is less than or equal to an amount of time threshold in order to determine the VGT assessment information. For example, the controller 180 may determine that the amount of time is less than or equal to the amount of time threshold, and may thereby determine that the VGT assessment information is to indicate that the VGT 214 is in an end-of-life state (e.g., because one or more bearings of the VGT 214, due to wear to the one or more bearings, are inhibiting rotation of the turbine 208 and thereby causing the speed of the VGT 214 to decrease too quickly). As an alternative example, the controller 180 may determine that the amount of time is greater than the amount of time threshold, and may thereby determine that the VGT assessment information is to indicate that the VGT 214 is not in an end-of-life state. The amount of time threshold may be, for example, 1 second, 2 seconds, 3 seconds, 4 seconds, or 5 seconds (or fractions thereof).

The controller 180 may cause one or more actions to be performed (e.g., based on the VGT 214 assessment information). For example, the controller 180 may cause a display (e.g., that is located in the operation station 120 of the machine 100) to present the VGT assessment information. In this way, the controller 180 may indicate to an operator of the machine 100 that the VGT 214 is near failure and/or should be replaced (e.g., when the assessment information indicates that the VGT 214 is in an end-of-life state) and the operator can adjust operation of the machine 100 accordingly (e.g., to mitigate a sudden chance of failure of the VGT 214) and/or schedule replacement of the VGT 214. This decreases a likelihood of a sudden failure of the VGT 214 (and therefore a sudden inability to operate the machine 100 as intended), and improves a likelihood that the VGT 214 will be replaced before the VGT 214 fails and causes damage to any other component of the machine 100.

As another example, the controller 180 may cause the VGT assessment information to be communicated to a device not included in the machine 100 (e.g., associated with a supervisor, a supervising organization, or another entity associated with the machine 100). The controller 180 may send a message to the device that includes at least part of the assessment information. This may allow the device (e.g., a user device, a server device, or another type of device) to facilitate scheduling replacement of the VGT 214 (e.g., when the assessment information indicates that the VGT 214 is in an end-of-life state), which improves a likelihood that the VGT 214 will be replaced before the VGT 214 fails and causes damage to any other component of the machine 100.

In an additional example, the controller 180 may prevent adjustment of at least one component of the VGT 214, such as when the assessment information indicates that the VGT 214 is in an end-of-life state. For example, the controller 180 may prevent at least one component (e.g., at least one adjustable vane) of the turbine 208 of the VGT 214 from adjusting to another position. In this way, when the at least one component of the VGT 214 is in an open position or a partially open position (e.g., as a result of the second adjustment of the at least one component of the VGT 214, described herein), the controller 180 may prevent the at least one component of the VGT 214 from adjusting to the closed position. This minimizes additional wear on the one or more bearings of the VGT 214, while also allowing an unrestricted flow of exhaust gas through the VGT 214, which reduces stress on the VGT 214 and therefore potential damage of the VGT 214. This decreases a likelihood of a sudden failure of the VGT 214 (and therefore a sudden inability to operate the machine 100 as intended), and improves a likelihood that the VGT 214 will be replaced before the VGT 214 fails and causes damage to any other component of the machine 100.

While some implementations described herein concern the controller 180 causing adjustable vanes of the turbine 208 of the VGT 214 to adjust (e.g., from a first vane position to a second vane position), implementations also include the controller 180 causing one or more other components of the VGT 214 to adjust. For example, the controller 180 may cause an adjustable intake or an adjustable outlet of the turbine 208 of the VGT 214 to adjust. As another example, the controller 180 may cause an adjustable flow area control element of the turbine 208 of the VGT 214 to adjust. Accordingly, the controller 180 may cause the one or more other components of the turbine 208 of the VGT 214 to adjust when causing (or instead of causing) the adjustable vanes of the turbine 208 of the VGT 214 to adjust.

The number and arrangement of devices and networks shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
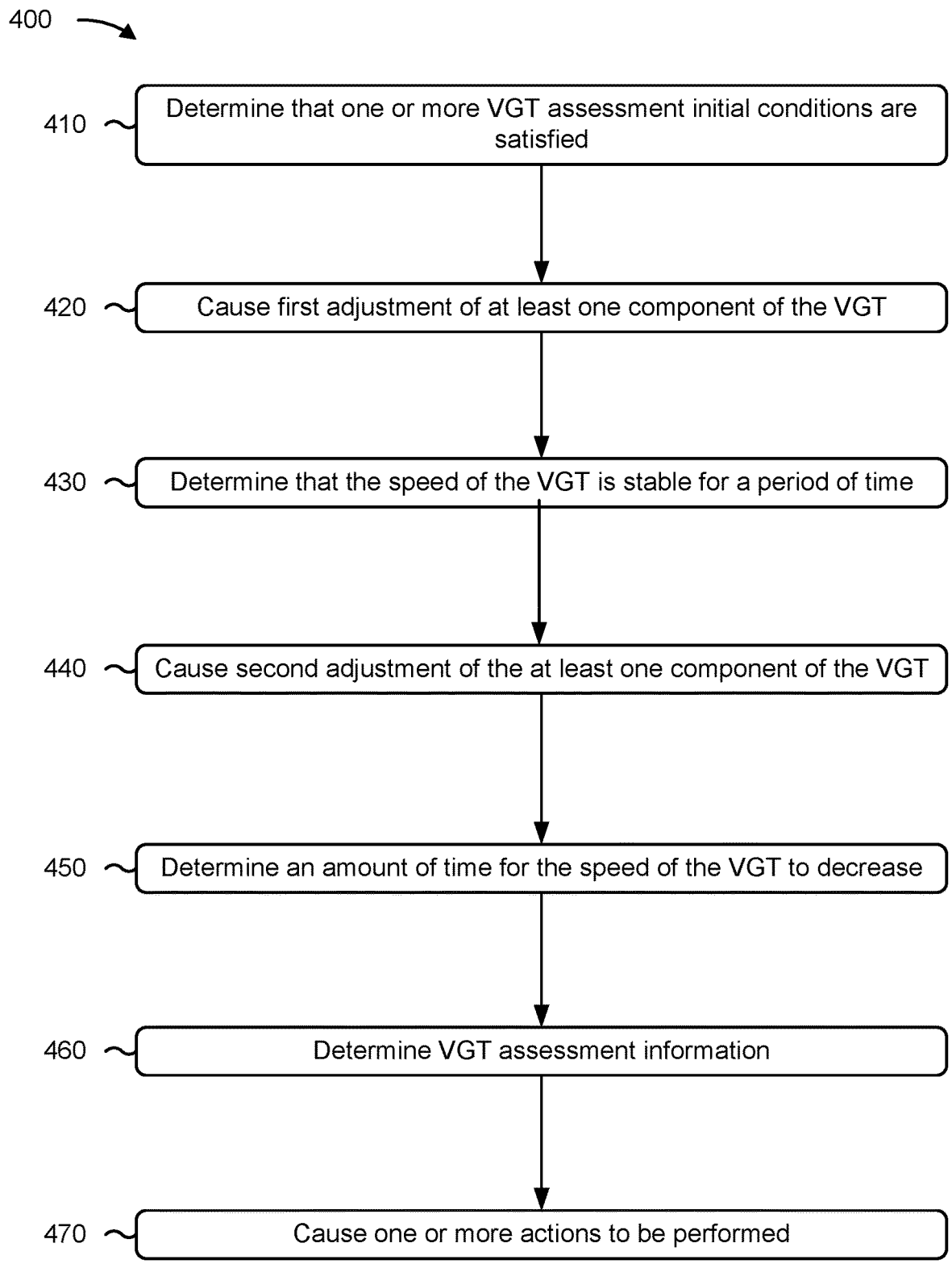
FIG. 4 is a flowchart of an example process associated with a VGT assessment.

FIG. 4 is a flowchart of an example process 400 associated with a VGT assessment. One or more process blocks of FIG. 4 may be performed by a controller (e.g., the controller 180). In some implementations, one or more process blocks of FIG. 4 may be performed by another device or a group of devices separate from or including the controller, such as a control device (e.g., the control device 310) and/or a sensor (e.g., the sensor 320).

As shown in FIG. 4, process 400 may include determining that one or more VGT assessment initial conditions are satisfied (block 410). For example, the controller may determine, based on operation of the machine, that one or more VGT assessment initial conditions are satisfied, as described above. Determining that the one or more VGT assessment initial conditions are satisfied may include at least one of: determining that the machine is in an idle state, determining that a speed of an engine of the machine is stable for another period of time, determining that an oil temperature of the engine of the machine is within a temperature range, or determining that the at least one component of the VGT is in a non-restricted position.

As further shown in FIG. 4, process 400 may include causing first adjustment of at least one component of the VGT (block 420). For example, the controller may cause, based on determining that the one or more VGT assessment initial conditions are satisfied, first adjustment of at least one component of the VGT to cause the VGT to restrict a flow of exhaust gas through the VGT and to cause a speed of the VGT to increase to be greater than or equal to a first speed threshold, as described above. Causing the first adjustment of the at least one component of the VGT may include causing at least one component of a turbine of the VGT to adjust from a first position to a second position that is associated with restricting the flow of exhaust gas through the VGT.

As further shown in FIG. 4, process 400 may include determining that the speed of the VGT is stable for a period of time (block 430). For example, the controller may determine, based on causing the first adjustment of the at least one component of the VGT, that the speed of the VGT is stable for a period of time, as described above. Determining that the speed of the VGT is stable for the period of time includes determining a variability percentage of the speed of the VGT from a start of the period of time to an end of the period of time, and determining, based on the variability percentage being less than or equal to 5%, that the speed of the VGT is stable for the period of time.

As further shown in FIG. 4, process 400 may include causing second adjustment of the at least one component of the VGT (block 440). For example, the controller may cause, based on determining that the speed of the VGT is stable for the period of time, second adjustment of the at least one component of the VGT to cause the VGT to cease restricting the flow of exhaust gas through the VGT and to cause the speed of the VGT to decrease to be less than or equal to a second speed threshold, as described above. Causing the second adjustment of the at least one component of the VGT may include causing the at least one component of the turbine of the VGT to adjust from the second position to the first position or another position that is not associated with restricting the flow of exhaust gas through the VGT.

As further shown in FIG. 4, process 400 may include determining an amount of time for the speed of the VGT to decrease (block 450). For example, the controller may determine, based on causing the second adjustment of the at least one component of the VGT, an amount of time for the speed of the VGT to decrease from greater than or equal to the first speed threshold to less than or equal to the second speed threshold, as described above. Determining the amount of time may include identifying a first instant of time associated with causing the second adjustment of the at least one component of the VGT as a start of the amount of time; identifying a second instant of time associated with the speed of the VGT becoming less than or equal to the second speed threshold; and determining the amount of time as a difference between the first instant of time and the second instant of time.

As further shown in FIG. 4, process 400 may include determining VGT assessment information (block 460). For example, the controller may determine, based on the amount of time, VGT assessment information, as described above. Determining the VGT assessment information may include determining whether the amount of time is less than or equal to an amount of time threshold, and determining, based on determining whether the amount of time is less than or equal to the amount of time threshold, the VGT assessment information. The VGT assessment information may indicate one of the VGT is in an end-of-life state, or the VGT is not in an end-of-life state.

As further shown in FIG. 4, process 400 may include causing one or more actions to be performed (block 470). For example, the controller may cause, based on the VGT assessment information, one or more actions to be performed, as described above. Causing the one or more actions to be performed may include causing a display of the machine to present the VGT assessment information, and/or causing the VGT assessment information to be communicated to a device not included in the machine, wherein causing the VGT assessment information to be communicated to the device not included in the machine allows the device to facilitate scheduling of replacement of the VGT.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The above-described techniques allow a controller 180 of a machine 100 to control a VGT 214 (e.g., a turbine 208 of the VGT 214) that is associated with a power source (e.g., a power source 160, which may include a power system 200) to facilitate assessment of the VGT 214. For example, the controller 180 causes first adjustment of at least one component of the VGT 214 (e.g., to restrict a flow of exhaust gas through the VGT 214 and thereby increase a speed of the VGT 214) and then causes, based on determining that the speed of the VGT 214 is stable (e.g., after the first adjustment), second adjustment of the at least one component of the VGT 214 (e.g., to cease restricting the flow of exhaust gas through the VGT 214 and thereby decrease the speed of the VGT 214). The controller 180 determines an amount of time for the speed to decrease to less than or equal to a speed threshold, and thereby determines VGT assessment information. For example, the controller 180 may determine that the amount of time is less than or equal to the amount of time threshold, and may thereby determine that the VGT assessment information is to indicate that the VGT is in an end-of-life state (e.g., because one or more bearings of the VGT 214, due to wear to the one or more bearings, are inhibiting rotation of the turbine 208 and thereby causing the speed of the VGT 214 to decrease too quickly). As an alternative example, the controller 180 may determine that the amount of time is greater than the amount of time threshold, and may thereby determine that the VGT assessment information is to indicate that the VGT 214 is not in an end-of-life state.

Accordingly, the controller 180, based on the VGT assessment information, causes one or more actions to be performed. For example, the controller 180 may cause the VGT assessment information to be presented (e.g., via a display of the machine 100), which allows the operator to adjust operation of the machine 100 accordingly. As another example, the controller 180 may cause the VGT assessment information to be communicated to a device not included in the machine 100, which allows the device to facilitate scheduling replacement of the VGT 214. In an additional example, the controller 180 may prevent adjustment of at least one component of the VGT 214. As a result, the controller 180 decreases a likelihood of a sudden failure of the VGT 214 (and therefore a sudden inability to operate the machine 100 as intended), and improves a likelihood that the VGT 214 will be replaced before the VGT 214 fails and causes damage to any other component of the machine 100.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A machine comprising:
    a variable geometry turbocharger (VGT); and
    a controller configured to:
        determine, based on operation of the machine, that one or more VGT assessment initial conditions are satisfied;
        cause, based on determining that the one or more VGT assessment initial conditions are satisfied, first adjustment of at least one component of the VGT to cause the VGT to restrict a flow of exhaust gas through the VGT and to cause a speed of the VGT to increase to be greater than or equal to a first speed threshold;
    determine, based on causing the first adjustment of the at least one component of the VGT, that the speed of the VGT is stable for a period of time;
    cause, based on determining that the speed of the VGT is stable for the period of time, second adjustment of the at least one component of the VGT to cause the VGT to cease restricting the flow of exhaust gas through the VGT and to cause the speed of the VGT to decrease to be less than or equal to a second speed threshold;
    determine, based on causing the second adjustment of the at least one component of the VGT, an amount of time for the speed of the VGT to decrease from greater than or equal to the first speed threshold to less than or equal to the second speed threshold;
    determine, based on the amount of time, VGT assessment information; and
    cause, based on the VGT assessment information, one or more actions to be performed.

2. The machine of claim 1, wherein the controller, to determine that the one or more VGT assessment initial conditions are satisfied, is configured to at least one of:
    determine that the machine is in an idle state;
    determine that a speed of an engine of the machine is stable for another period of time;
    determine that an oil temperature of the engine of the machine is within a temperature range; or
    determine that the at least one component of the VGT is in a non-restricted position.

3. The machine of claim 1, wherein the controller, to cause the first adjustment of the at least one component of the VGT, is configured to:
    cause at least one component of a turbine of the VGT to adjust from a first position to a second position that is associated with restricting the flow of exhaust gas through the VGT.

4. The machine of claim 3, wherein the controller, to cause the second adjustment of the at least one component of the VGT to, is configured to:
    cause the at least one component of the turbine of the VGT to adjust from the second position to the first position or another position that is not associated with restricting the flow of exhaust gas through the VGT.

5. The machine of claim 1, wherein the controller, to determine that the speed of the VGT is stable for the period of time, is configured to:
    determine a variability percentage of the speed of the VGT from a start of the period of time to an end of the period of time; and
    determine, based on the variability percentage being less than or equal to 5%, that the speed of the VGT is stable for the period of time.

6. The machine of claim 1, wherein the controller, to determine the amount of time, is configured to:
    identify a first instant of time associated with causing the second adjustment of the at least one component of the VGT as a start of the amount of time;
    identify a second instant of time associated with the speed of the VGT becoming less than or equal to the second speed threshold; and
    determine the amount of time as a difference between the first instant of time and the second instant of time.

7. The machine of claim 1, wherein the controller, to determine the VGT assessment information, is configured to:
    determine whether the amount of time is less than or equal to an amount of time threshold; and
    determine, based on determining whether the amount of time is less than or equal to the amount of time threshold, the VGT assessment information.

8. The machine of claim 1, wherein the VGT assessment information indicates one of:
    the VGT is in an end-of-life state, or
    the VGT is not in an end-of-life state.

9. The machine of claim 1, wherein the controller, to cause the one or more actions to be performed, is configured to:
    cause a display of the machine to present the VGT assessment information.

10. The machine of claim 1, wherein the controller, to cause the one or more actions to be performed, is configured to:
    cause the VGT assessment information to be communicated to a device not included in the machine,
        wherein causing the VGT assessment information to be communicated to the device not included in the machine allows the device to facilitate scheduling of replacement of the VGT.

11. A controller of a machine, comprising:
    one or more memories; and
    one or more processors configured to:
        cause first adjustment of at least one component of a variable geometry turbocharger (VGT) of the machine;
        determine, based on causing the first adjustment of the at least one component of the VGT, that a speed of the VGT is stable for a period of time;
        cause, based on determining that the speed of the VGT is stable for the period of time, second adjustment of the at least one component of the VGT;
        determine, based on causing the second adjustment of the at least one component of the VGT, an amount of time for the speed of the VGT to decrease from greater than or equal to a first speed threshold to less than or equal to a second speed threshold;
        determine, based on the amount of time, VGT assessment information; and
        cause, based on the VGT assessment information, one or more actions to be performed.

12. The controller of claim 11, wherein causing the first adjustment of the at least one component of the VGT causes the VGT to restrict a flow of exhaust gas through the VGT and causes the speed of the VGT to increase to be greater than or equal to the first speed threshold.

13. The controller of claim 11, wherein causing the second adjustment of the at least one component of the VGT causes the VGT to cease restricting a flow of exhaust gas through the VGT and causes the speed of the VGT to decrease to be less than or equal to the second speed threshold.

14. The controller of claim 11, wherein the one or more processors, to cause the first adjustment of the at least one component of the VGT, are configured to:
    cause at least one component of a turbine of the VGT to adjust from a first position to a second position.

15. The controller of claim 14, wherein the one or more processors, to cause the second adjustment of the at least one component of the VGT to, are configured to:

cause the at least one of component of the turbine of the VGT to adjust from the second position to the first position or another position.

16. The controller of claim 11, wherein the one or more processors, to determine the VGT assessment information, are configured to:
   determine that the amount of time is less than or equal to an amount of time threshold; and
   determine, based on determining that the amount of time is less than or equal to the amount of time threshold, that the VGT assessment information is to indicate that the VGT is in an end-of-life state.

17. The controller of claim 11, wherein the one or more processors, to determine the VGT assessment information, are configured to:
   determine that the amount of time is greater than an amount of time threshold; and
   determine, based on determining that the amount of time is greater than the amount of time threshold, that the VGT assessment information is to indicate that the VGT is not in an end-of-life state.

18. A method, comprising:
   causing, by a controller of a machine, first adjustment of at least one component of a variable geometry turbocharger (VGT) of the machine;
   causing, by the controller and based on causing the first adjustment of the at least one component of the VGT, second adjustment of the at least one component of the VGT;
   determining, by the controller and based on causing the second adjustment of the at least one component of the VGT, an amount of time for a speed of the VGT to decrease to less than or equal to speed threshold;
   determining, by the controller and based on the amount of time, VGT assessment information; and
   determining, by the controller and based on the VGT assessment information, one or more actions to be performed.

19. The method of claim 18, wherein causing the first adjustment of the at least one component of the VGT, comprises:
   causing at least one component of a turbine of the VGT to restrict a flow of exhaust gas through the VGT.

20. The method of claim 19, wherein causing the second adjustment of the at least one component of the VGT, comprises:
   causing the at least one of component of the turbine of the VGT to cease restricting the flow of exhaust gas through the VGT.

* * * * *